Oct. 7, 1958  G. CARP  2,855,556
INCHING MECHANISM
Filed April 6, 1955
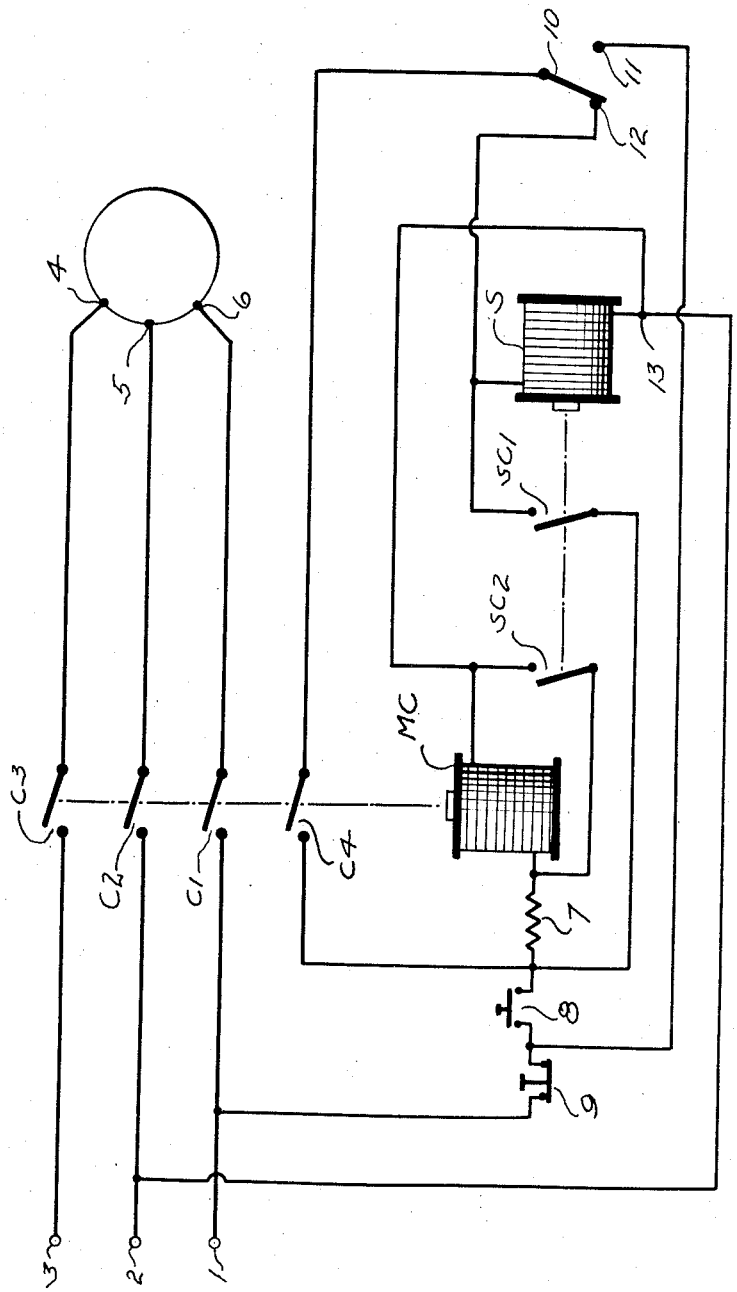
INVENTOR.
GEORGE CARP
BY
ATTORNEY

United States Patent Office 2,855,556
Patented Oct. 7, 1958

2,855,556
INCHING MECHANISM
George Carp, Stamford, Conn.

Application April 6, 1955, Serial No. 499,581

10 Claims. (Cl. 318—443)

This invention relates to an inching circuit for an electric motor. Circuits of this type are extremely useful in effecting the positive inching or jogging of a motor, thereby facilitating the adjustment of the machine that is operated by the motor. Since circuits of the particular class are well known and well understood by those skilled in the art, I shall not herein discuss more fully the desirability of such circuits.

In inching circuits of the prior art it is usual to have a main motor control relay which when energized effects the closing of the motor circuit, preferably through contactors operated by the relay. The energizing of the motor control relay is effected usually by a manually operated switch, and it becomes necessary thereafter to open the circuit upon expiration of a predetermined time interval while the manually operated switch is held closed. The opening of the circuit is generally effected by a time controlled relay that begins operation immediately upon the closing of the motor control relay by the manually operated switch. Upon the opening of the circuit of the motor control relay by the time controlled relay, arcing frequently occurs, as those skilled in the art will fully appreciate.

As a feature of my invention, I eliminate the possibility of such arcing by effecting the shorting of the motor control relay after the expiration of a predetermined time interval. So far as I know, this is a basically new concept and contributes an extremely desirable result that has long been sought in circuits of the particular class.

As a further feature of my invention, I utilize the closing of the circuit of the motor control relay for closing the circuit of a further relay that in turn effects the opening of the circuit of the motor. In other words, the actuation of the motor control relay and the closing of the motor circuit effect the sequential operation of a further relay whose operation then brings about the opening of the motor circuit. Thus, whereas in the prior art the operation of a time delayed relay for opening the motor circuit begins immediately upon the actuation of the motor control relay that closes the motor circuit, in my invention the closing of the motor circuit first takes place and then there is effected the closing of the circuit of a relay that in turn causes the opening of the motor circuit. Through this sequential operation I obtain a positive control and an assured operation of the motor for the predetermined interval to which it is set to operate.

As a further feature of this last portion of my invention, the closing of the motor circuit by the motor control relay will be followed by the shorting of the motor control relay and the consequent opening of the motor circuit, all through energization of a shorting relay by the energizing of the motor control relay.

Those skilled in the art will appreciate that through my construction I am able to obtain a most desirable sequential operation that is positive and completely effective to produce a desired cycle. It will be further appreciated that I eliminate the arcing that is a feature of prior inching circuits of the class desired.

As a still further feature of my invention, the circuit is so arranged that normal running of the motor without inching may be effected readily.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, the single figure illustrates diagrammatically my motor circuit.

I utilize three power lines 1, 2, and 3, leading to three binding posts at the motor, designated by reference numerals 4, 5, and 6. The contactors for closing the circuit of the motor through posts 4, 5, and 6 are designated by reference letters $C_1$, $C_2$, and $C_3$. The motor control relay is designated by the letters MC and it actuates the contactors $C_1$, $C_2$, and $C_3$. A fourth contactor closed by the actuation of the motor control relay MC is designated by $C_4$. The shorting relay is designated by reference letter S, and the contactors closed thereby are designated $SC_1$ and $SC_2$. A resistor 7 is utilized, as is a starting button 8, a stop button 9, and a switch blade 10 operating between points 11 and 12.

Let us now assume that the motor circuit is open at contactors $C_1$, $C_2$, and $C_3$ and that it is desired to inch or jog the motor connected to the binding posts 4, 5, and 6. The manually operated pushbutton is moved to close a circuit at 8, through the resistor 7 and the motor control relay MC to point 12 and back to 2. The excitation of the motor control relay MC will of course close the contactors $C_1$, $C_2$, and $C_3$, and establish the circuit of the motor through the binding posts 4, 5, and 6.

Simultaneously, the fourth contactor $C_4$ actuated by the motor control relay MC will also be closed and a circuit will be established from 1 through stop button 9, switch 8, $C_4$, 10, 12, shorting relay S, point 13, and through the wire to the point 2. The closing of the circuit of shorting relay S effects immediately the closing of the contactors $SC_1$ and $SC_2$. It will be appreciated that upon the closing of the contactor $SC_2$, the motor control relay MC will be shorted through contactor $SC_2$, and the four contactors $C_1$, $C_2$, $C_3$, and $C_4$, will be opened. This will naturally open the circuit of the motor connected to posts 4, 5, and 6, and the motor will stop.

The closing of contactor $SC_1$ will, of course, establish a sustaining circuit for the shorting relay S from 1 through 9, pushbutton 8, contactor $SC_1$, relay S, point 13 and back to the line at 2. This closing of the shorting relay circuit will be independent of the motor control relay MC so that the motor control relay will remain shorted through contactor $SC_2$ even after motor control relay MC opens the contactor $C_4$. Further, even though the pushbutton is held to close the circuit at 8, the motor control relay MC will remain shorted and the motor will have stopped. Of course, the shorting relay S may be of any preferred type to give such action as is desired. Should the circuit be opened at 8, then the circuit of shorting relay S will be opened, but the motor control relay MC will also be in an open circuit, and the motor will remain deenergized. Naturally, upon a re-closing of the circuit at 8, the cycle just described will be repeated.

If it be desired to run the motor continuously, the switch blade 10 is moved into contact at 11, opening the circuit at 12. This immediately places shorting relay S completely out of any circuit thereafter. Now, upon depression of the pushbutton 8, the several contactors $C_1$, $C_2$, $C^3$, and $C_4$, will be closed and the motor will be energized. The closing of the contactor $C_4$ will establish a circuit through the motor control relay MC independent of pushbutton 8, this circuit being from 1 through stop button 9, contact 11, switch blade 10, contactor $C_4$, resistor 7, motor control relay MC, point 13 and back to 2. It is quite obvious that my novel circuit may be used for jogging and inching, or for continuous running of the motor. I believe that the operation of my invention and its very considerable contribution to the art will now be appreciated and understood.

I now claim:

1. In an inching circuit for an electric motor, a relay for effecting the closing of the circuit of said motor upon the energization of said relay, an energizing circuit for said relay, a normally open shorting circuit for shorting out said relay, and means for effecting the closing of said shorting circuit energized incidental to the energization of said relay.

2. In an inching circuit for an electric motor, a relay for effecting the closing of the circuit of said motor upon the energization of said relay, an energizing circuit for said relay including a manually operated switch for closing the said circuit, a normally open shorting circuit for shorting out said relay, and means for effecting the closing of said shorting portion energized incidental to the energization of said relay by the operation of said manually operated switch.

3. In an inching circuit for an electric motor, a relay for effecting the closing of the circuit of said motor upon the energization of said relay, an energizing circuit for said relay, a normally open shorting circuit for shorting out said relay, and means for effecting the closing of said shorting circuit actuated by said relay upon the energization thereof.

4. In an inching circuit for an electric motor, a relay for effecting the closing of the circuit of said motor upon the energization of said relay, an energizing circuit for said relay including a manually operated switch for closing the said circuit, a normally open shorting circuit for shorting out said relay, and means for effecting the closing of said shorting circuit actuated by said relay upon the energization thereof.

5. In an inching circuit for an electric motor, a motor control relay for effecting the closing of the circuit of said motor upon the energization of said motor control relay, an energizing circuit for said motor control relay including a switch the closing of which closes the circuit of said motor control relay, a further relay having a normally open circuit, means whereby said motor control relay when energized closes said circuit for said further relay, and a shorting circuit for said motor control relay closed by said further relay upon the energizing thereof.

6. In an inching circuit for an electric motor, a motor control relay for effecting the closing of the circuit of said motor upon the energization of said motor control relay, an energizing circuit for said motor control relay including a switch the closing of which closes the circuit of said motor control relay, a further relay having a normally open circuit including said switch, means whereby said motor control relay when energized closes said circuit for said further relay, a shorting circuit for said motor control relay closed by said further relay upon the energizing of said further relay, and a sustaining circuit for said further relay also closed by said further relay upon its energization.

7. In an inching circuit for an electric motor, a motor control relay for effecting the closing of the circuit of said motor upon the energization of said relay, an energizing circuit for said motor control relay, a normally open shorting circuit portion for shorting out said motor control relay, a shorting relay for effecting the closing of said shorting circuit portion, means whereby said shorting relay is energized incidental to the energization of said motor control relay, and means whereby said shorting relay closes its own circuit independently of said motor control relay upon energization thereof.

8. In an inching circuit for an electric motor, a motor relay for effecting the closing of the circuit of said motor upon the energization of said motor relay, an energizing circuit for said motor relay, a further relay having a normally open circuit, means whereby said motor relay when energized closes said circuit for said further relay, a shorting circuit for said motor relay, and means for closing said shorting circuit actuated by said further relay upon the energizing of said further relay.

9. In an inching circuit for an electric motor, a motor relay for effecting the closing of the circuit of said motor upon the energization of said motor relay, a further relay having a normally open circuit, an energizing circuit for said motor relay, means whereby said motor relay when energized closes said circuit for said further relay, a control circuit for said motor relay closed by said further relay upon the energizing thereof, and a sustaining circuit for said further relay also closed by said further relay upon its energization.

10. In an inching circuit for an electric motor, a motor control relay for effecting the closing of the circuit of said motor upon the energization of said relay, an energizing circuit for said motor control relay including a manually operated switch for closing the said circuit, a normally open shorting circuit for shorting out said motor control relay, a shorting relay for effecting the closing of said shorting circuit, means whereby said shorting relay is energized incidental to the energization of said motor control relay by the operation of said manually operated switch, a sustaining circuit for said shorting relay closed upon the energizing of said shorting relay, said sustaining circuit including said manually operated switch.

References Cited in the file of this patent

UNITED STATES PATENTS

| | | |
|---|---|---|
| 1,775,730 | McNicol | Sept. 16, 1930 |
| 2,686,895 | Feldhausen | Aug. 17, 1954 |